(12) United States Patent
Wang

(10) Patent No.: US 10,947,926 B1
(45) Date of Patent: Mar. 16, 2021

(54) DEVICES, SYSTEMS, AND METHODS FOR GENERATING POWER

(71) Applicant: Taiwan Happy Energy Co., Ltd., Zhubei (TW)

(72) Inventor: Chih Hung Wang, Zhubei (TW)

(73) Assignee: TAIWAN HAPPY ENERGY CO., LTD., Zhubei (TW)

( * ) Notice: Subject to any disclaimer, the term of this patent is extended or adjusted under 35 U.S.C. 154(b) by 0 days.

(21) Appl. No.: 16/547,307

(22) Filed: Aug. 21, 2019

(51) Int. Cl.
*F02G 1/043* (2006.01)
*F03G 7/05* (2006.01)

(52) U.S. Cl.
CPC ............. *F02G 1/043* (2013.01); *F03G 7/05* (2013.01)

(58) Field of Classification Search
CPC ..... F03G 7/04; F03G 7/05; F03G 7/06; F02G 2270/70; F02G 1/043; F02G 1/02; F02G 1/045; F02G 1/047; F02G 1/05; F02G 1/04; F02G 1/0435; F02G 1/044
See application file for complete search history.

(56) References Cited

U.S. PATENT DOCUMENTS

| | | | | |
|---|---|---|---|---|
| 3,608,311 | A * | 9/1971 | Roesel | F02G 1/0435 60/516 |
| 5,771,693 | A * | 6/1998 | Coney | F04B 31/00 60/407 |
| 7,506,509 | B2 * | 3/2009 | Stock | F01K 27/005 60/659 |
| 2006/0213502 | A1* | 9/2006 | Baker | F03G 6/02 126/568 |
| 2017/0175672 | A1* | 6/2017 | VanDyne | F22B 1/006 |

* cited by examiner

*Primary Examiner* — Shafiq Mian
*Assistant Examiner* — Xiaoting Hu
(74) *Attorney, Agent, or Firm* — Finnegan, Henderson, Farabow, Garrett & Dunner, LLP

(57) ABSTRACT

A power generation device includes a first chamber, a second chamber coupled with the first chamber, a first and a second spray devices. The first and second chambers contain working fluid flowable between the first and second chambers via a flow passage between the first and second chambers, and a first and a second space above a portion of the working fluid that is within the first and second chambers. First spray device is coupled with the first chamber to heat or cool the first space in the first chamber. Second spray device is coupled with the second chamber to heat or cool the second space in the second chamber. At least one of the heating and cooling of the first space may cause at least one of a compression or expansion force of the second space, which may drive a power-extraction unit coupled with the second chamber.

20 Claims, 12 Drawing Sheets

DEVICES, SYSTEMS, AND METHODS FOR GENERATING POWER

TECHNICAL FIELD

The present disclosure relates to devices and systems for generating power, and more particularly, to devices and systems for generating electric power using temperature difference between two heat sources.

BACKGROUND

Conventional power generation, such as nuclear- and coal-based power generation, are common sources of power generation. However, as the rising concern on reducing environmental impacts, such as greenhouse gas emission, nuclear waste pollution, etc., the need for renewable energy arises. Common examples include wind, solar, and other eco-friendly power generation methods.

The temperature gradient between two heat sources can be used to generate power. For example, energy can be extracted from the temperature difference between a surface and given depths of the earth and the oceans, or from waste heat resulted in landfills or in industrial processes. These thermal energy conversion systems have become a promising approach for producing electricity for future generations. However, the manufacturing cost is still high, and the energy conversion efficiency is relatively low, especially when compared with conventional power generation systems. Accordingly, there is a need to improve the thermal energy conversion systems, in order provide alternatives, provide efficiency, or reduce production costs.

SUMMARY

The present disclosure provides a device to generate power. Consistent with one of the embodiments, the device includes a first chamber, a second chamber, at least one first spray device, and at least one second spray device. The first chamber contains a working fluid and a first space inside the first chamber, the first space being above a portion of the working fluid that is within the first chamber. The second chamber is coupled with the first chamber. The working fluid is flowable between the first chamber and the second chamber via a flow passage between the first chamber and the second chamber. The second chamber contains a second space inside the second chamber, the second space being above a portion of the working fluid that is within the second chamber. The at least one first spray device is coupled with the first chamber to heat or cool the first space in the first chamber. The at least one second spray device is coupled with the second chamber to heat or cool the second space in the second chamber. At least one of the heating and cooling of the first space may cause at least one of a compression or expansion force of the second space, and at least one of the compression or expansion force of the second space may drive a power-extraction unit coupled with the second chamber.

Consistent with another embodiments, the present disclosure provides an energy conversion system, which may include one or more devices to generate power. Any one of those devices includes a first chamber, a second chamber, at least one first spray device, and at least one second spray device. The first chamber contains a working fluid and a first space inside the first chamber, the first space being above a portion of the working fluid that is within the first chamber. The second chamber is coupled with the first chamber. The working fluid is flowable between the first chamber and the second chamber via a flow passage between the first chamber and the second chamber. The second chamber contains a second space inside the second chamber, the second space being above a portion of the working fluid that is within the second chamber. The at least one first spray device is coupled with the first chamber to heat or cool the first space in the first chamber. The at least one second spray device is coupled with the second chamber to heat or cool the second space in the second chamber. At least one of the heating and cooling of the first space may cause at least one of a compression or expansion force of the second space, and at least one of the compression or expansion force of the second space may drive a power-extraction unit coupled with the second chamber.

Consistent with a further embodiment, the present disclosure further provides a method for generating power, including: providing at least one of a liquid, air, and mist having a temperature higher than a current temperature of a first space in a first chamber to heat gas in the first space, the first space being above a portion of a working fluid that is within the first chamber; providing at least one of a liquid, air, and mist having a temperature lower than the current temperature of the first space to cool gas in the first space; and driving a power-extraction unit coupled with a second chamber by at least one of a compression or expansion force of a second space of the second chamber, the second space being above a portion of the working fluid that is within the second chamber, in which the second chamber is coupled with the first chamber, the working fluid is flowable between the first chamber and the second chamber via a flow passage between the first chamber and the second chamber, and the compression or expansion force is caused by the heating or cooling of the first space.

It is to be understood that the foregoing general descriptions and the following detailed descriptions are exemplary and explanatory only, and are not restrictive of the disclosure, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts. The implementations set forth in the following description of exemplary embodiments are examples of devices and methods consistent with the aspects related to the disclosure as recited in the appended claims, and not meant to limit the scope of the present disclosure.

Figure 1:
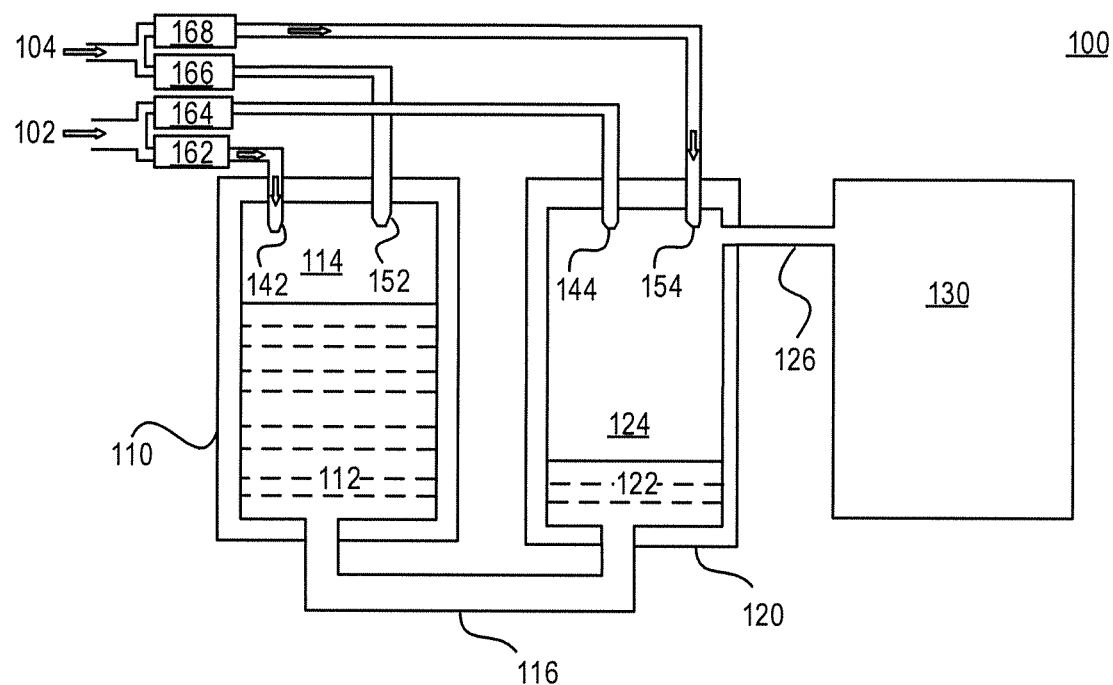
FIG. 1 illustrates an exemplary device to generate power, consistent with some embodiments of the present disclosure.

FIG. 1 is a diagram which illustrates an exemplary device 100 to generate power, consistent with some embodiments of the present disclosure. Device 100, also referred to as a thermodynamic engine, is configured to convert heat provided in the form of a temperature difference to a non-heat form of energy. In some embodiments, device 100 can be applied in various types of thermal energy conversion systems for producing electricity by harnessing geothermal energy or the energy of oceans. For example, device 100 can be deployed in an ocean thermal energy conversion system to produce power in the form of electricity by using the temperature difference between cooler deep seawater and warmer shallow or surface seawater to run a heat engine. In some other embodiments, device 100 can be deployed in a geothermal energy conversion system to harness electricity from the geothermal resources, or in a waste-heat-to-power system to convert waste heat into power.

As shown in FIG. 1, device 100 includes chambers 110, 120 coupled with each other via a flow passage 116, and a power-extraction unit 130. The power-extraction unit 130 is coupled with chamber 120 via a flow passage 126. Chamber 110 contains working fluid 112 and a space 114 above a portion of working fluid 112 that is within chamber 110. Similarly, chamber 120 also contains working fluid 122 and a space 124 above a portion of working fluid 122. Examples of gas that would be suitable for use as a working gas in spaces 114, 124 include air, nitrogen, hydrogen, and helium, but the present disclosure is not limited thereto. In various embodiments, the working gas in spaces 114 and 124 may be the same or different types of gas and may be a combination of two or more gases. Working fluid 112, 122 is flowable between chamber 110 and chamber 120 via a flow passage 116 and used as a liquid piston. Examples of liquids that would be suitable for use as working fluid 112, 122 may include water, seawater, their combinations, or virtually any liquid. In some of the embodiments, a liquid that will not or is less likely to change state in the presence of the working gas in spaces 114, 124 and the working temperatures and pressures of device 100 may be used.

Device 100 further includes spray devices to utilize a thermodynamic Stirling cycle for converting thermal energy. In particular, spray devices in device 100 include heating sprays 142, 144 and cooling sprays 152, 154. Heating spray 142 and cooling spray 152 coupled with chamber 110 are configured to heat or cool space 114 in chamber 110, and heating spray 144 and cooling spray 154 coupled with chamber 120 are configured to heat or cool space 124 in chamber 120. In some embodiments, heating spray 142 is a heating spray configured to heat space 114, and sprays at least one of a liquid, air, and mist having a temperature higher than a current temperature of space 114. As shown in FIG. 1, in a heating process applied to chamber 110, warmer seawater from an input terminal 102 is pumped by a pump 162 and sprayed through heating spray 142 into space 114 to heat space 114. On the other hand, cooling spray 152 is a cooling spray configured to cool space 114, and sprays at least one of a liquid, air, and mist having a temperature lower than a current temperature of space 114. In a cooling process applied to chamber 110, cooler seawater (e.g., seawater in a deep region of the ocean) from an input terminal 104 is pumped by a pump 166 and sprayed through cooling spray 152 into space 114 to cool space 114. That is, heating spray 142 and cooling spray 152 respectively spray the fluid into chamber 110.

Operations and configurations of sprays 144 and 154 are similar to which of the sprays 142 and 152. Heating spray 144 is a heating spray configured to heat space 124, and sprays at least one of a liquid, air, and mist having a temperature higher than a current temperature of space 124. In a heating process applied to chamber 120, warmer seawater from input terminal 102 is pumped by a pump 164 and sprayed through heating spray 144 into space 124 to heat space 124. On the other hand, cooling spray 154 is a cooling spray configured to cool space 124, and sprays at least one of a liquid, air, and mist having a temperature lower than a current temperature of space 124. In a cooling process applied to chamber 120, cooler seawater from input terminal 104 is pumped by a pump 168 and sprayed through cooling spray 154 into space 124 to cool space 124. That is, heating spray 144 and cooling spray 154 respectively spray the fluid into chamber 120.

At least one of the heating and cooling of space 114 causes at least one of a compression or expansion force of space 124, which drives power-extraction unit 130 coupled with chamber 120. Accordingly, a turbine and a generator connected to power-extraction unit 130 can be driven by gas or by other working fluids outputted from power-extraction unit 130 to generate electricity, in response to variations in a temperature of space 114 and of space 124. For the ease of understanding, operations of device 100 will be described in detail with accompanying figures in the following paragraphs.

Figure 2:
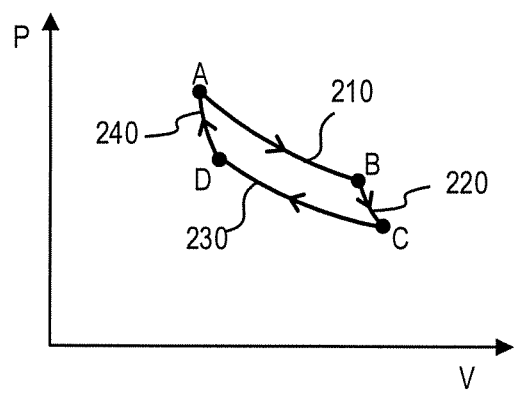
FIG. 2 is a pressure-volume graph illustrating four thermodynamic processes in a Stirling cycle acting on the air or gas in the spaces of the device, consistent with some embodiments of the present disclosure.

Reference is made to FIG. 2 and FIGS. 3A-3D. FIG. 2 illustrates a pressure-volume graph 200 of four thermodynamic processes in a Stirling cycle acting on the air or gas in space 114 and 124, consistent with some embodiments of the present disclosure. The horizontal axis denotes the volume of the gas in the chamber, and the vertical axis denotes the pressure of the gas in the chamber. FIGS. 3A-3D are diagrams illustrating operations of device 100 during the processes in the Stirling cycle shown in FIG. 2, consistent with some embodiments of the present disclosure.

Figure 3A:
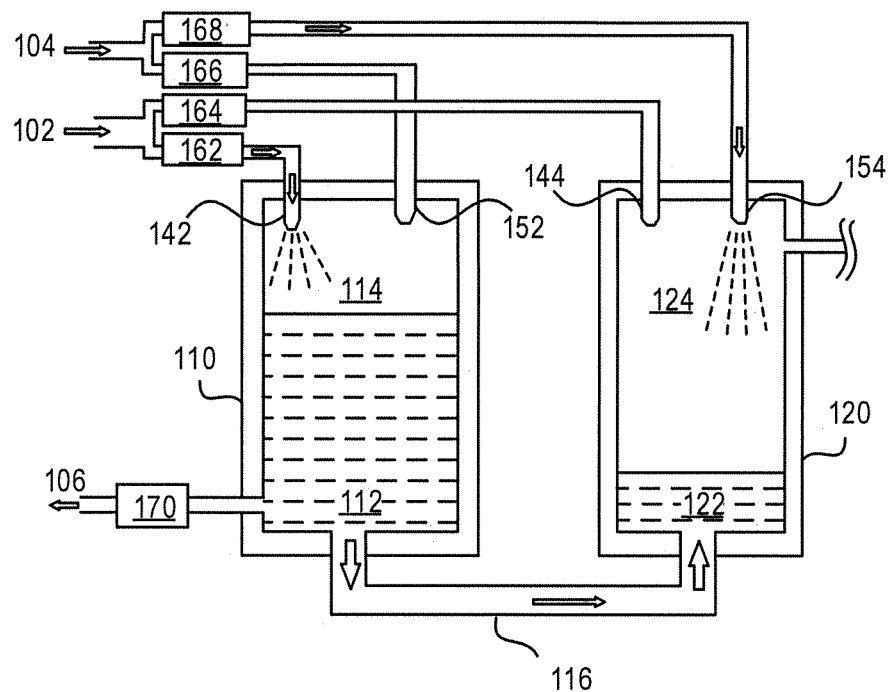
FIGS. 3A-3D are diagrams which illustrate operations of an exemplary device during the processes in the Stirling cycle shown in FIG. 2, consistent with some embodiments of the present disclosure.

In device 100 shown in FIG. 3A, space 114 is at operating point A, while space 124 is at operating point C. As the pressure in space 114 being greater than the pressure in space 124, working fluid flows from chamber 110 to chamber 120 via flow passage 116. Accordingly, the surface of working liquid 122 rises as the surface of working liquid 112 falls. Heating spray 142 sprays warm seawater into chamber 110, cooling spray 154 sprays cool seawater into chamber 120, so that during this stage, the operating point of gas in space 114 moves from point A to point B through curve 210, which represents an isothermal expansion process. On the other hand, the operating point of gas in space 124 moves from point C to point D through curve 230, which represents an isothermal compression process. Therefore, space 114 is maintained at a constant high temperature, and the gas undergoes near-isothermal expansion absorbing heat from a hot source (e.g., warm seawater sprayed from heating spray 142), while space 124 is maintained at a constant low temperature so the gas undergoes near-isothermal compression rejecting heat to a cold sink (e.g., cool seawater sprayed from cooling spray 154).

Figure 3B:
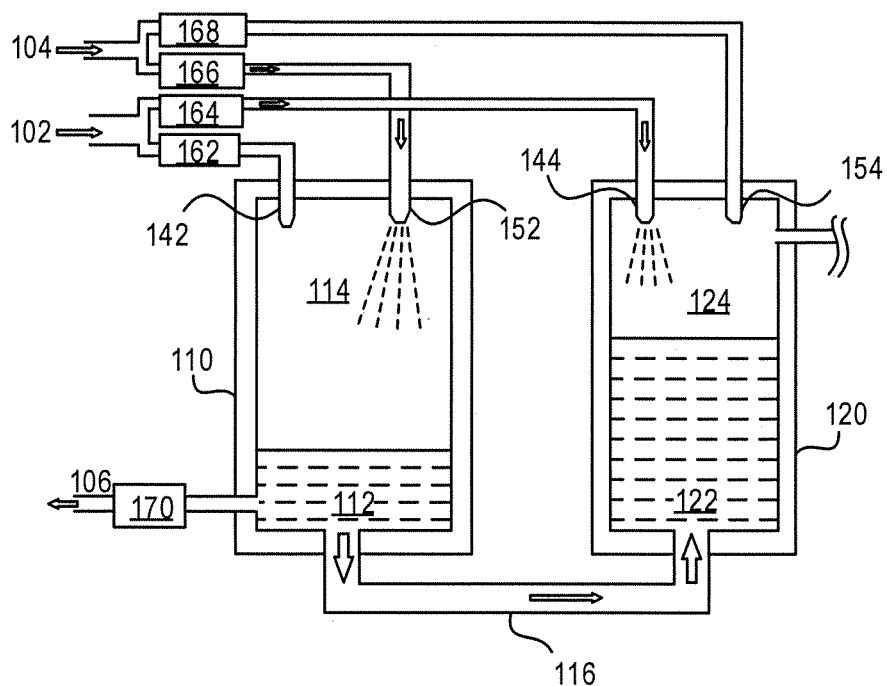

In device 100 shown in FIG. 3B, space 114 is at operating point B, while space 124 is at operating point D. At this stage, working fluid continues to flow from chamber 110 to chamber 120. Gas in space 114 keeps expanding, while gas in space 124 keeps compressing. Heating spray 144 sprays cool seawater into chamber 110 in response in order to cool the gas in space 114, and cooling spray 152 sprays warm seawater into chamber 120 in response, in order to heat the gas in space 124.

Accordingly, as the gas in space 114 is cooled, the operating point of gas in space 114 moves along curve 220 from operating point B to operating point C, which represents a constant-volume, also known as an isometric process or isochoric, heat-removal process, for the next cycle. On the other hand, as the gas in space 124 is heated, the operating point of gas in space 124 moves along curve 240 from operating point D to operating point A, which represents a constant-volume heat-addition process.

Figure 3C:
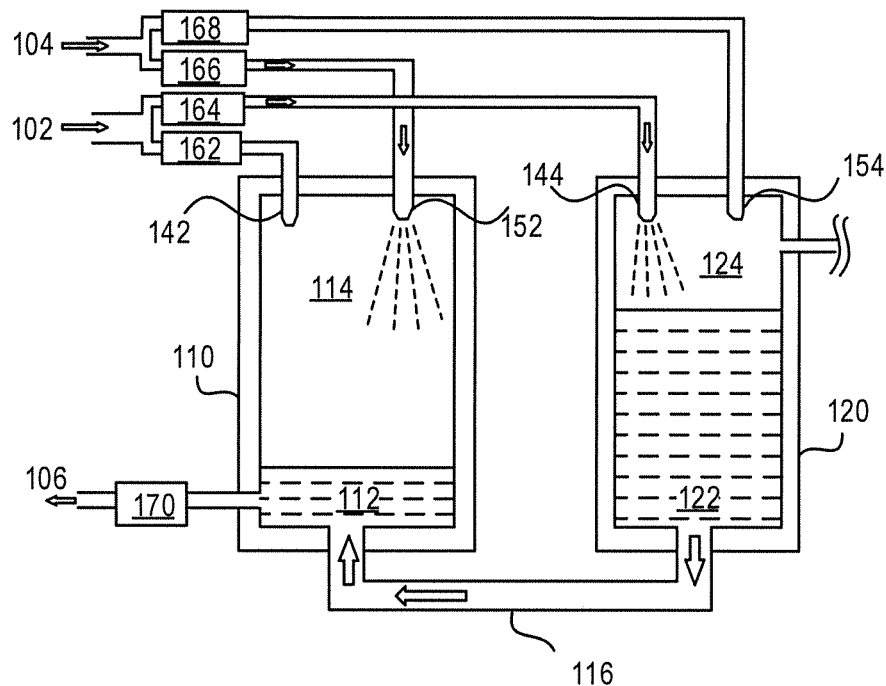

In device 100 shown in FIG. 3C, space 114 is at operating point C, while space 124 is at operating point A. The working fluid stops flowing from chamber 110 to chamber 120, and, as the pressure in space 124 being greater than the pressure in space 114, working fluid starts to flow, in a reverse direction, from chamber 120 to chamber 110 via flow passage 116. Similar to the operations discussed above, the surface of working liquid 112 rises as the surface of working liquid 122 falls. Heating spray 144 sprays warm seawater into chamber 120, cooling spray 152 sprays cool seawater into chamber 110, so that during this stage, the operating point of gas in space 124 moves from point A to point B through curve 210, and the operating point of gas in space 114 moves from point C to point D through curve 230. Therefore, space 124 is maintained at a constant high temperature, and the gas undergoes near-isothermal expansion absorbing heat from a hot source (e.g., warm seawater sprayed from heating spray 144), while space 114 is maintained at a constant low temperature. and the gas undergoes near-isothermal compression rejecting heat to a cold sink (e.g., cool seawater sprayed from cooling spray 152).

Figure 3D:
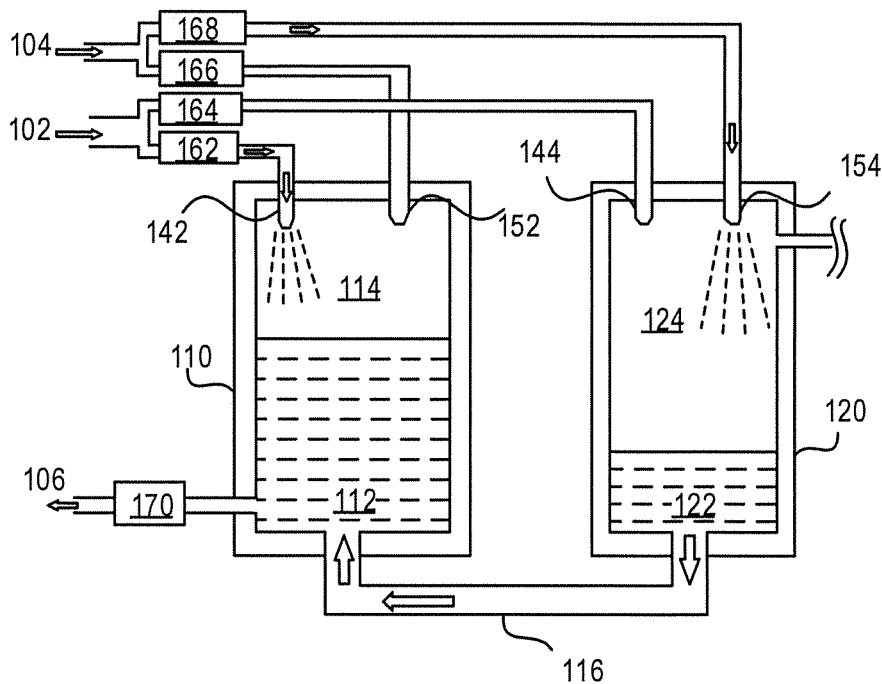

Finally, in device 100 shown in FIG. 3D, space 114 is at operating point D, while space 124 is at operating point B. At this stage, working fluid continues to flow from chamber 120 to chamber 110. Gas in space 124 keeps expanding, while gas in space 114 keeps compressing. Cooling spray 154 sprays cool seawater into chamber 120 accordingly in order to cool the gas in space 124, and heating spray 142 sprays warm seawater into chamber 110 accordingly in order to heat the gas in space 114. Accordingly, as the gas in space 124 is cooled, the operating point of gas in space 124 moves along curve 220 from operating point B to operating point C, which represents a constant-volume, also known as isovolumetric or isochoric, heat-removal process, for the next cycle. As the gas in space 114 is heated, the operating point of gas in space 114 moves along curve 240 from operating point D to operating point A, which represents a constant-volume heat-addition process.

As shown in FIGS. 3A-3D, in some embodiments, device 100 further includes a discharging valve 170, which is coupled with chamber 110 and configured to control a discharging passage 106 for discharging the working fluid. Therefore, while seawater is sprayed into chambers 110, 120 during the operations, by discharging same amount of the seawater, the total volume of the working fluid in device 100 remains constant. In some other embodiments, discharging valve 170 may be coupled with chamber 120, or coupled with both chamber 110 and chamber 120, and configured to control discharging passage 106 for discharging the working fluid.

Through the operations described above, a heat cycle through curves 210, 220, 230, and 240 is completed for both chambers 110 and 120. Through repeating the heating and cooling processes described with reference to FIGS. 3A-3D, the heat cycle may repeat continuously and convert heat energy to pressure energy stored in gas. After that, power-extraction unit 130 can further convert the pressure energy stored in the gas into electricity.

Figure 4A:
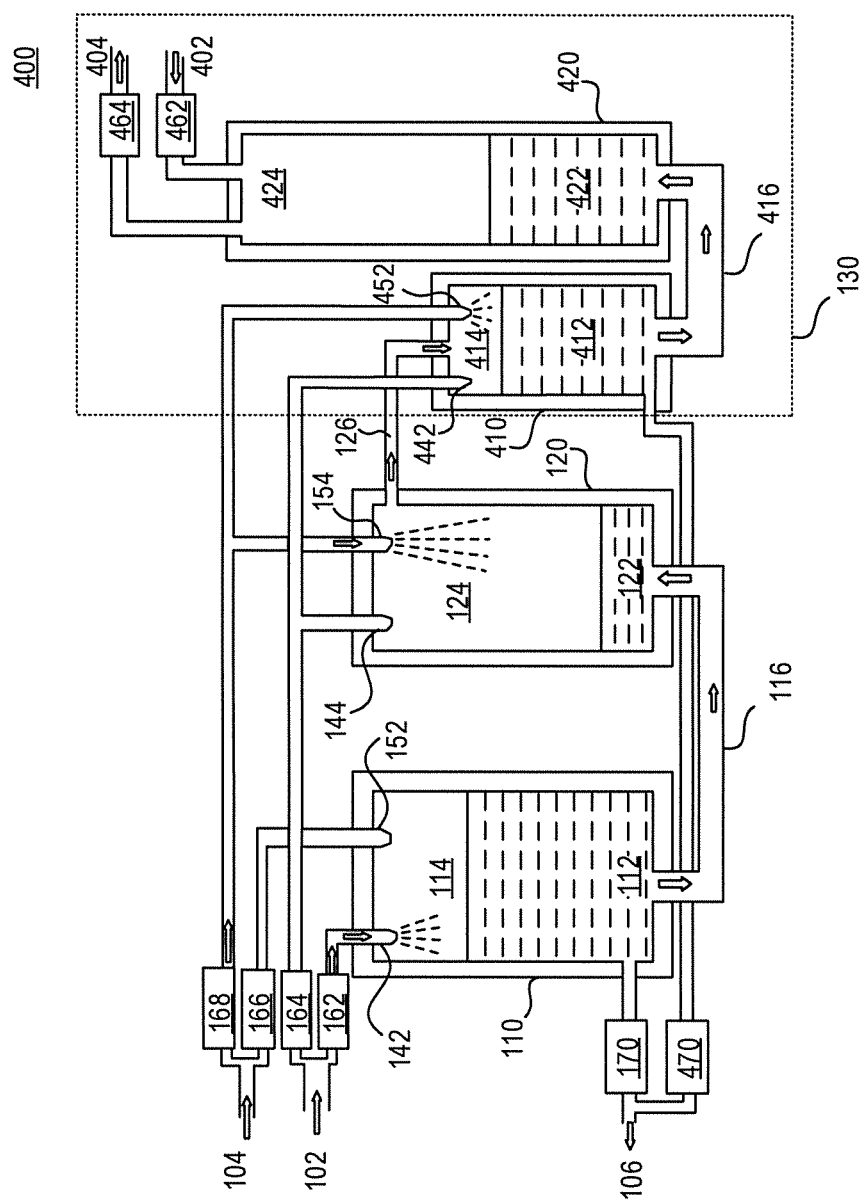
FIG. 4A and FIG. 4B illustrate an exemplary device to generate power, consistent with some embodiments of the present disclosure.
Figure 4B:
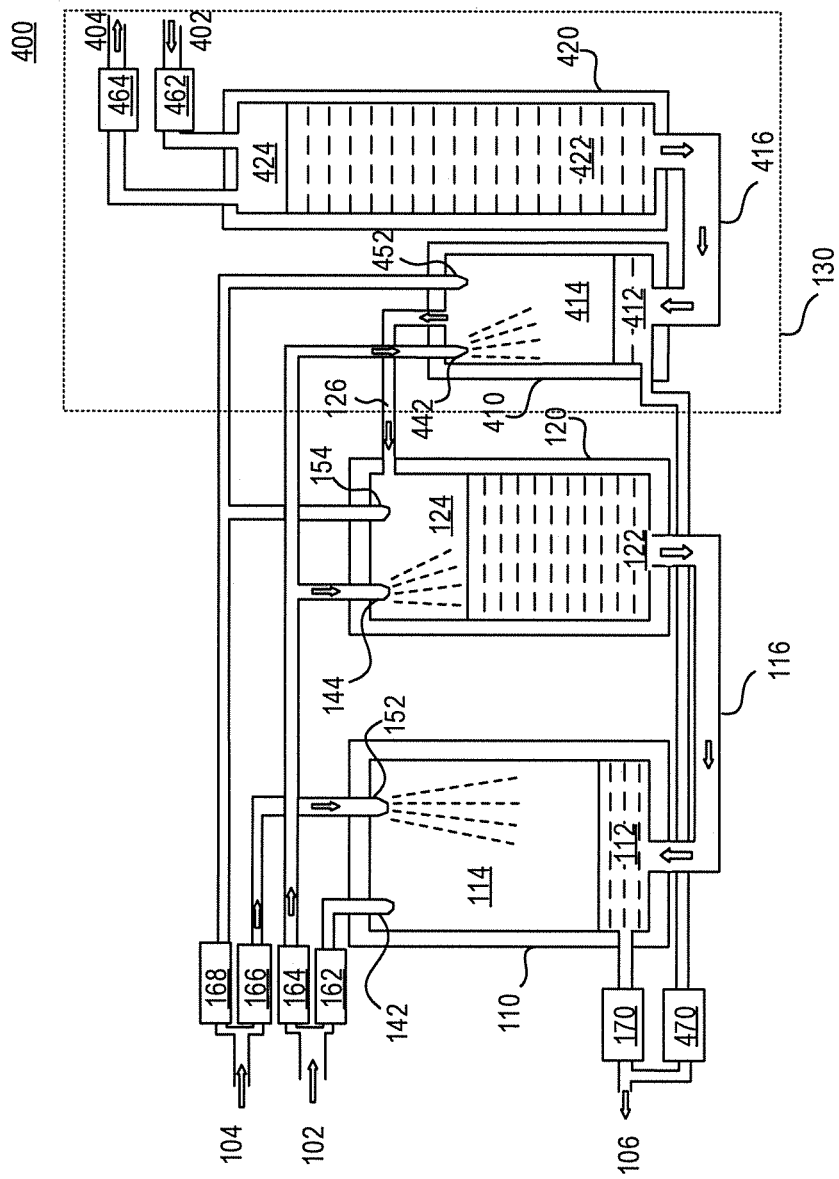

FIG. 4A and FIG. 4B are diagrams which illustrate a device 400 to generate power, consistent with some embodiments of the present disclosure. As shown in FIG. 4A and FIG. 4B, in some embodiments, in device 400, power-extraction unit 130 includes an input terminal 402, an output terminal 404, and chambers 410 and 420. Chamber 410 is coupled with chamber 120 via flow passage 126 and contains working fluid 412 and a space 414 inside chamber 410 above a portion of working fluid 412 that is within chamber 410. Chamber 420 also contains working fluid 422 and a space 424 inside chamber 420 above a portion of working fluid 422 that is within chamber 420. As shown in FIG. 4A and FIG. 4B, chamber 420 is coupled with chamber 410 via a flow passage 416, so that the working fluid is flowable between chamber 410 and chamber 420 via flow passage 416.

Input terminal 402 and output terminal 404 are coupled with chamber 420 respectively via control valves 462 and 464 configured to control the gas flowing into or flowing out of chamber 420. Therefore, in response to the compression or expansion force of space 124, gas within space 424 can be outputted from chamber 420 via output terminal 404, and gas with a pressure lower than an output pressure of the gas outputted from chamber 420 can be fed into chamber 420 via input terminal 402, under the control of control valves 462 and 464.

A heating spray 442 and a cooling spray 452 are coupled with chamber 410 and configured to heat or cool space 414 in chamber 410 by spraying at least one of a liquid, air, and mist having a temperature higher or lower than the current temperature of space 414. As shown in FIG. 4A and FIG. 4B, configurations and arrangements of heating spray 442 and cooling spray 452 coupled with chamber 410 are the same as or similar to sprays 144 and 154 coupled with chamber 120. Also, a discharging valve 470 is coupled with chamber 410 or chamber 420 and configured to control discharging passage 106 for discharging the working fluid. Therefore, while seawater is sprayed into chambers 410, 420 during the operations, by discharging the same amount of the seawater, the total volume of the working fluid remains constant.

As shown in FIG. 4A, since space 414 communicates with space 124, in response to the compression force of space 124, the pressure of gas in space 414 increases, and the working liquid flows from chamber 410 to chamber 420 via flow passage 416, which causes a compression force of space 424. When the gas pressure of space 424 equals to the pressure at output terminal 404, control valve 464 opens and gas within space 424 is outputted from chamber 420 via output terminal 404, until the surface of working fluid 112 in chamber 110 reaches the lowest level.

As shown in FIG. 4B, after the surface of working fluid 112 in chamber 110 reaches the lowest level, in response to the expansion force of space 124, the pressure of gas in space 414 decreases, and the working liquid flows reversely from chamber 420 to chamber 410 via flow passage 416, which causes an expansion force of space 424. When the gas pressure of space 424 equals to the pressure at input terminal 402, control valve 462 opens and gas with a pressure lower than the pressure of the outputted gas is fed into chamber 420 via input terminal 402, until the cycle is completed with the surface of working fluid 112 in chamber 110 reaching the highest level. By operations described above, high pressure gas can be obtained from output terminal 404, and the mechanical power can then be extracted by various engines, such as a reciprocating engine, or a turbine engine, in order to generate electricity. Flow of the gas causes rotation of the turbine which can be used to drive a generator or other mechanical device to extract energy from device 400.

In view of the above, in some embodiments, by spraying a liquid, air, or mist having a relative high temperature in the chambers, the gas in a chamber can be heated evenly and results in a greater heat transfer efficiency. The compression or expansion force applied to a working fluid, which may be viewed like or work as the liquid piston, can then cause power-extraction unit 130 to output high pressure gas to drive the turbine and generator in the thermal energy conversion system.

Figure 5:
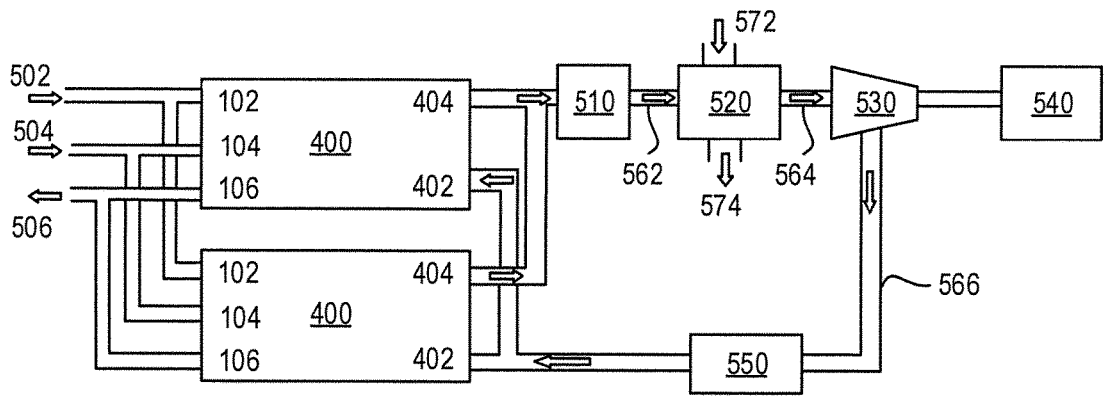
FIG. 5 illustrates an exemplary ocean thermal energy conversion (OTEC) system having multiple devices of FIG. 4A and FIG. 4B, consistent with some embodiments of the present disclosure.

Reference is made to FIG. 5, which illustrates an exemplary ocean thermal energy conversion (OTEC) system 500, consistent with some embodiments of the present disclosure. As shown in FIG. 5, OTEC system 500 includes two devices 400 connected in parallel, input terminals 502, 504, a discharging terminal 506, a high-pressure tank 510, a heating device 520, a turbine engine 530, a generator 540, and a low-pressure tank 550. It is noted that OTEC system 500 illustrated in FIG. 5 is an example and not meant to limit the present disclosure. In some embodiments, OTEC system 500 may include three or more devices 400 connected in parallel.

Input terminal 502 is configured to receive warmer shallow or surface seawater and connected to input terminals 102 of devices 400. Input terminal 504 is configured to receive cooler deep seawater and connected to input terminals 104 of devices 400. Discharging terminal 506 is configured to discharge seawater after use and connected to discharging passages 106 of devices 400.

When devices 400 output the gas with high pressure from output terminals 404, as described in the operations illustrated in FIG. 4A and FIG. 4B, the outputted gas is fed into high-pressure tank 510 and then provided, via a pipe 562, to heating device 520. Heating device 520 is configured to heat the gas using the warm seawater or other heat source, in which terminals 572 and 574 are the input and output terminals of the heat source. The heated gas is then provided, via a pipe 564, to turbine engine 530 and drives turbine engine 530 to output mechanical power for generator 540 to generate electricity. After passing through turbine engine 530, the gas with lower pressure discharges through an exhaust of turbine engine 530 and is provided, via a pipe 566, to a low-pressure tank 550. Therefore, low pressure gas can be circulated back into devices 400 via input terminal 402 connected to low-pressure tank 550 for the use in the following cycle. It is noted that, in some embodiments, multiple devices 400 in OTEC system 500 can output high pressure gas in different phases correspondingly. Therefore, the variation of pressure can be reduced in order to provide a stable output with lower fluctuation.

By utilizing multiple devices 400 as the thermodynamic engine, OTEC system 500 can achieve a simplified structure with fewer device components and simple pipe arrangements. Therefore, a lower manufacturing cost can be guaranteed when compared to those using conventional thermodynamic engines, and the per unit electricity generation cost can be reduced. In addition, devices 400 can be used as the thermodynamic engine in both a low-temperature difference (LTD) Stirling engine scenario, and a high-temperature difference (HTD) Stirling engine scenario. In some embodiments, devices 400 can be operated with a wide range of temperature differences, such as 1° C., 10° C., 100° C. and a value between about 1° C. to 100° C. The temperature range can also vary depending on the operating pressure. In other words, a device can work with (or as) an energy conversion system using ocean thermal energy, geothermal energy, landfill heat energy, waste heat from industrial processes, etc., as the heat source. In addition, when applied in applications with the high temperature difference (e.g., greater than 100° C.) between chambers, devices 400 can provide a higher energy conversion efficiency when compared to the conventional thermodynamic engines.

Figure 6:
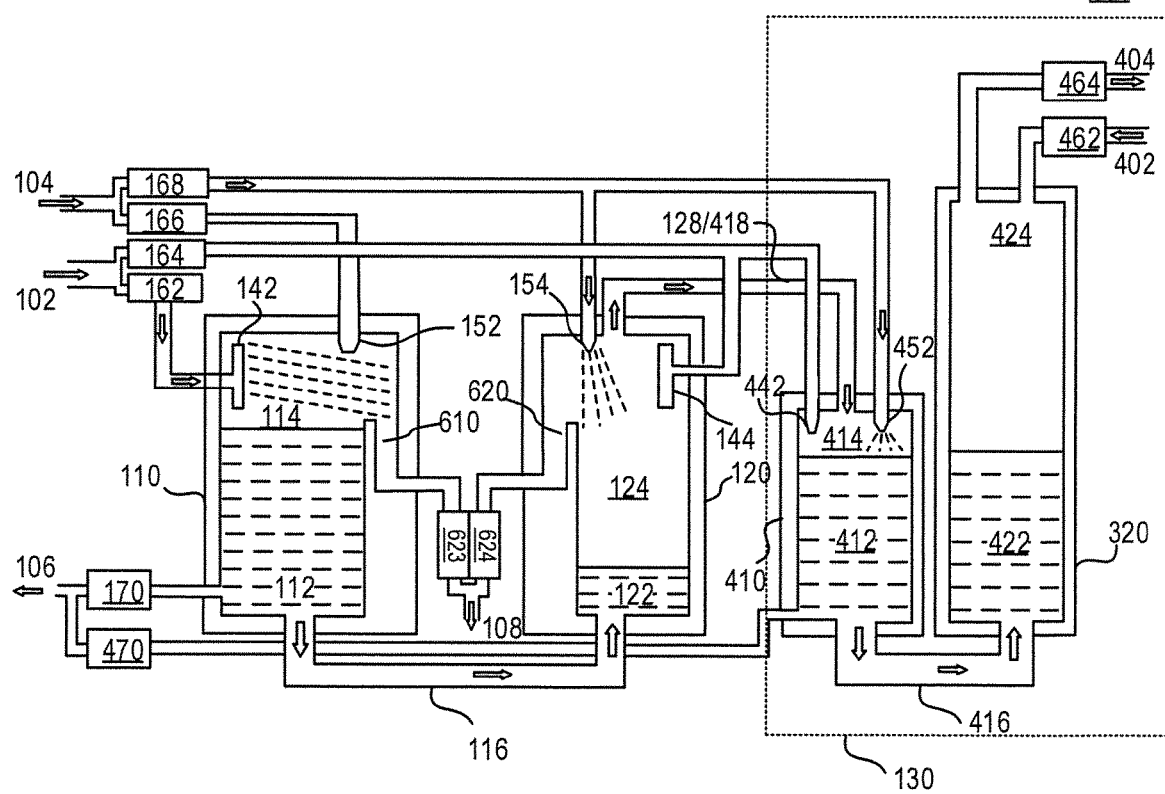
FIG. 6 illustrates an exemplary device to generate power, consistent with some embodiments of the present disclosure.

Reference is made to FIG. 6, which illustrates a device 600 to generate power, consistent with some embodiments of the present disclosure. In some embodiments, device 600 can be deployed in a geothermal energy conversion (GEC) system, in which the heat stored in hot water piped from the underground is converted into other forms of energy, such as electricity. Compared to device 400 shown in FIG. 4A and FIG. 4B, device 600 further includes liquid recycle chambers 610 and 620, and liquid recycle valves 623 and 624. As shown in FIG. 6, liquid recycle chamber 610 is coupled with chamber 110, and heating spray 142 is configured to spray the liquid into liquid recycle chamber 610, while cooling spray 152 is configured to spray the fluid into chamber 110. Similarly, liquid recycle chamber 620 is coupled with chamber 120, and heating spray 144 is configured to spray the liquid into liquid recycle chamber 620, while cooling spray 154 is configured to spray the fluid into chamber 120.

Liquid recycle valves 623 and 624 are respectively coupled with liquid recycle chambers 610, 620 and configured to control a passage 108 for discharging liquid in liquid recycle chambers 610, 620. By arranging liquid recycle chambers 610 and 620 and liquid recycle valves 623 and 624, instead of mixing with the working fluid in chamber 110, 120, the hot water can be collected after heating the gas in space 114, 124 and then be sprayed into another device 600. That is, the same heat source (e.g., hot water from underground) can heat chambers 110 and 120 in multiple devices 600.

Figure 7:
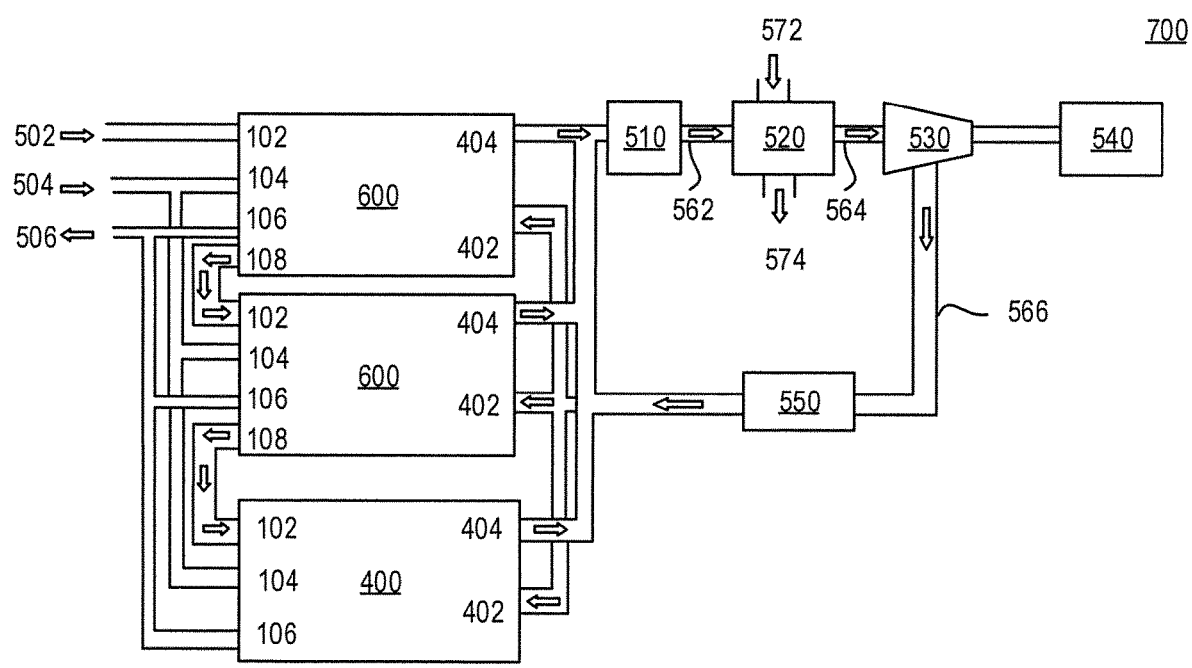
FIG. 7 illustrates an exemplary geothermal energy conversion (GEC) system having multiple devices of FIG. 6, consistent with some embodiments of the present disclosure.

Reference is made to FIG. 7, which illustrates an exemplary GEC system 700 having multiple devices 600 illustrated in FIG. 6, consistent with some embodiments of the present disclosure. Compared to OTEC system 500 shown in FIG. 5, GEC system 700 includes multiple devices 600, and passage 108 of one device 600 is connected to input terminal 102 of a next-stage device 600 for providing heat source. For the sake for simplicity and ease of understanding, FIG. 7 illustrates two devices 600 and one device 400 at the end stage of GEC system 700, but the present disclosure is not limited thereto. In various embodiments, the number of devices 600 deployed in GEC system 700 can be modified based on actual needs and practices.

In GEC system 700, in a geothermal well installation, hot water from underground can be piped and provided via input terminal 502 and flow through multi-stages of devices 600 as the heat source to heat gas in chambers of multiple devices 600. Accordingly, thermal energy stored in the hot water can be extracted in multiple stages in order to produce a higher energy conversion efficiency. At the last stage, passage 108 of device 600 in penultimate stage is connected to input terminal 102 of device 400. Therefore, the fluid is sprayed into chambers 110, 120 of device 400 at the last stage in GEC system 700, and then discharged via discharging passage 106 of device 400. Other operations in GEC system 700 shown in FIG. 7 are the same as or similar to operations of OTEC system 500 shown in FIG. 5.

Figure 8:
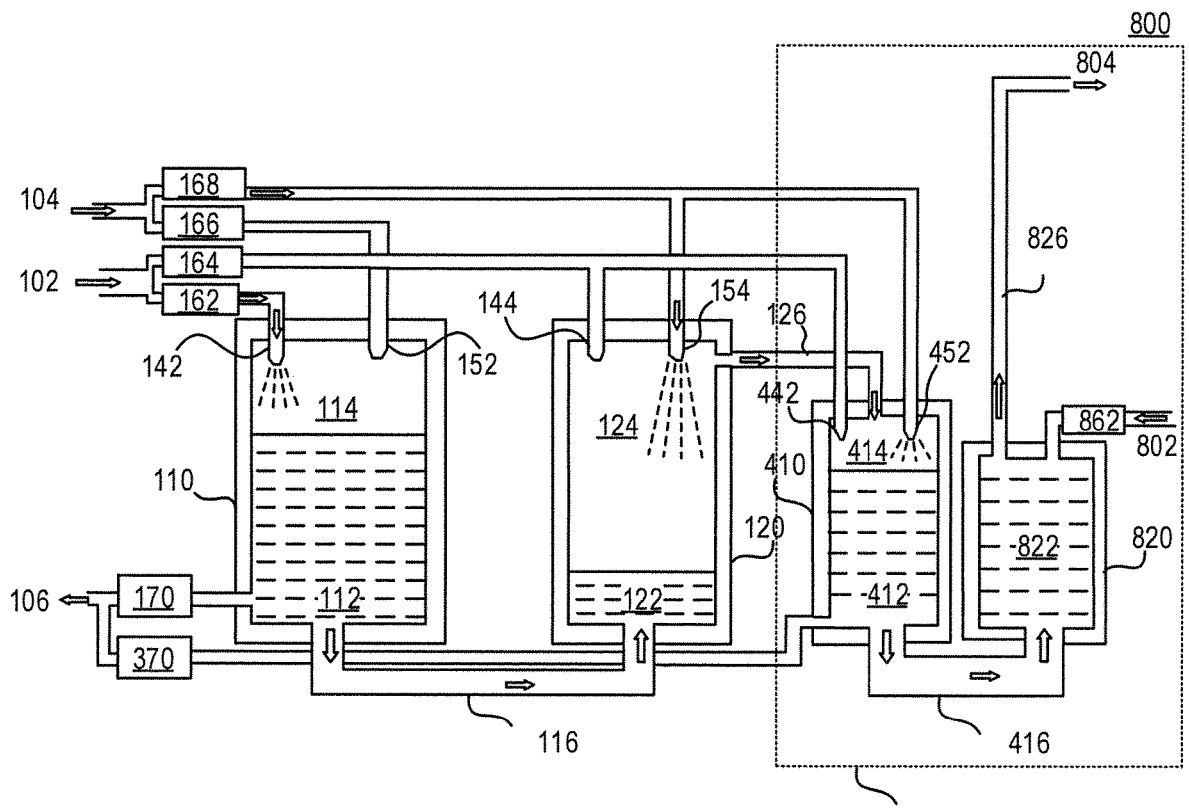
FIG. 8, FIG. 9, FIG. 10A and FIG. 10B illustrate exemplary devices to generate power, consistent with some embodiments of the present disclosure.

In various embodiments, power-extraction unit 130 can be realized by different approaches. Reference is made to FIG. 8, which illustrates a device 800 to generate power, consistent with some embodiments of the present disclosure. Compared to device 400 shown in FIG. 4A and FIG. 4B, power-extraction unit 130 in device 800 includes chambers 410 and 820, an input terminal 802 coupled with chamber 820, and an output terminal 804 coupled with chamber 820. Similar to chamber 420 in FIG. 4A and FIG. 4B, chamber 820 also contains working fluid 822. Working fluid 412, 822 is flowable between chamber 410 and chamber 820 via flow passage 416 connecting chambers 410 and 820.

Input terminal 802 is coupled with chamber 820 via a control valve 862 configured to control the working fluid flowing into chamber 820. Therefore, in response to the compression or expansion force of space 124, working fluid 822 within chamber 820 can be raised via a flow passage 826 and outputted via output terminal 804. Accordingly, working fluid is transferred to a water tower or a reservoir at a relatively high location, and the energy is converted in the form of potential energy of the working fluid, which is proportional to an altitude difference between the water tower or the reservoir, and a lower tank coupled to input terminal 802. By releasing the working fluid from the water tower or the reservoir into the lower tank through one or more turbines, water can drive the turbine(s) and one or more generators coupled to the turbine(s) to produce electricity. Then, working fluid can flow back into chamber 820 via input terminal 802, under the control of control valve 862.

Accordingly, in various embodiments, the generator connected to power-extraction unit 130 is configured to generate electricity driven by gas or by the working fluid outputted from the power-extraction unit, in response to variations in a temperature of space 114 and of space 124.

Figure 9:
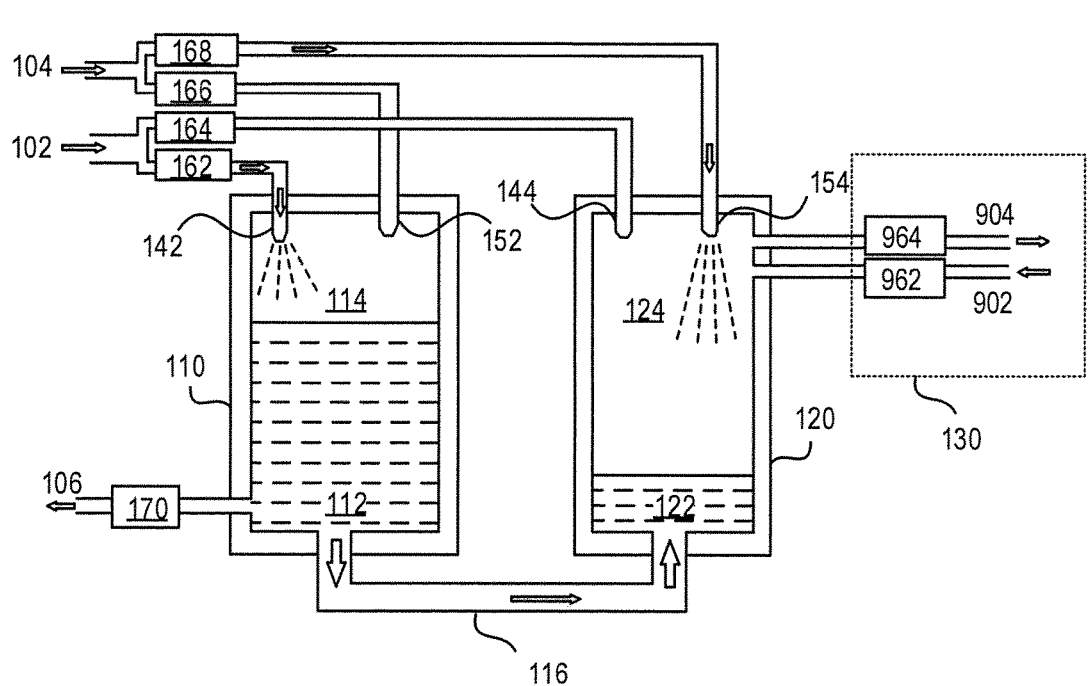

Reference is made to FIG. 9, which illustrates a device 900 to generate power, consistent with some embodiments of the present disclosure. In device 900, power-extraction unit 130 can be realized without additional chambers. In response to the compression or expansion force of space 124, a portion of gas in space 124 can be outputted directly with a relative high pressure via an output terminal 904, under the control of a control valve 964 coupled between chamber 120 and output terminal 904. Then, after driving the turbine and generator, gas with a relative low pressure can be fed back into chamber 120 via an input terminal 902, under the control of a control valve 962 coupled between chamber 120 and input terminal 902. In particular, in some embodiments, the amount of gas outputted via output terminal 904 can be detected via a detection component. In response to the amount of the outputted gas reaching a threshold value or in response to the level of working fluid 112 in chamber 110 reaching a lowest level, control valve 964 is configured to terminate the outputting of the gas in chamber 120.

Figure 10A:
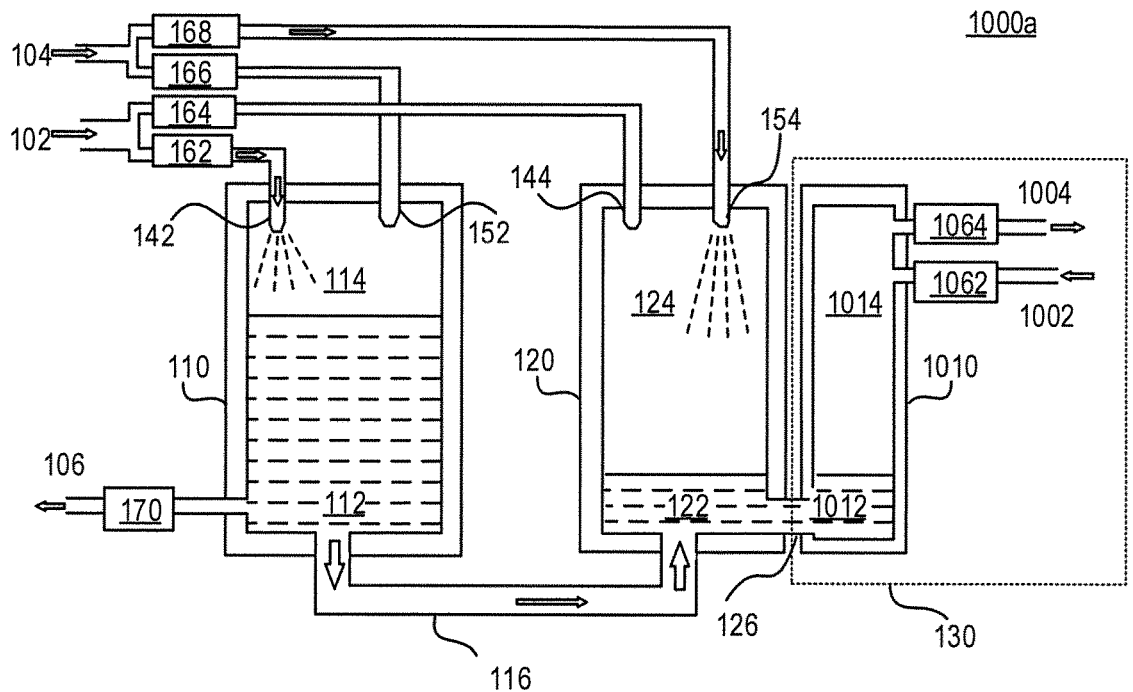
Figure 10B:
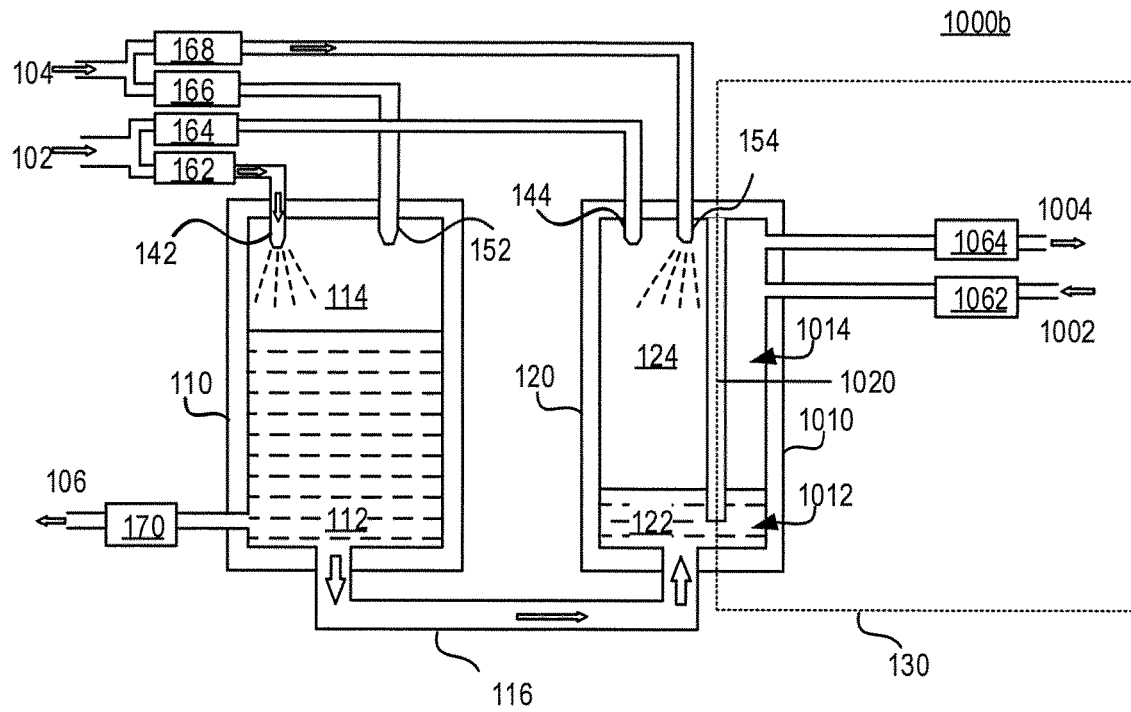

Reference is made to FIG. 10A and FIG. 10B, which illustrate devices 1000a and 1000b to generate power, consistent with some embodiments of the present disclosure. In device 1000a shown in FIG. 10A, power-extraction unit 130 includes one chamber 1010 coupled with chamber 120 via flow passage 126, an input terminal 1002 and an output terminal 1004, both coupled with chamber 1010. Similarly, chamber 1010 contains working fluid 1012 and a space 1014 inside chamber 1010 above a portion of working fluid 1012 that is within chamber 1010. In some embodiments, the length of flow passage 126 connecting chambers 120 and 1010 is shorter than the length of flow passage 116 connecting chambers 110 and 120.

Accordingly, in response to the compression or expansion force of space 124, gas within space 1014 is outputted from chamber 1010 via output terminal 1004, under the control of a control valve 1064 coupled between chamber 1010 and output terminal 1004. Then, after driving the turbine and generator, gas with a relative low pressure can be fed into chamber 1010 via input terminal 1002, under the control of a control valve 1062 coupled between chamber 1010 and input terminal 1002. As shown in FIG. 10B, in some embodiments, chamber 120 and chamber 1010 can also be implemented by two partitions, partially separated by a wall 1020, while working fluid (e.g., working fluid 122, 1012) is still flowable between chamber 120 and chamber 1010. Operations of devices 1000a and 1000b are the same as or similar to those described above in aforementioned embodiments.

In view of the above, different designs and configurations can be applied in power-extraction unit 130. The embodiments illustrated in the above figures are merely examples and not meant to limit the present disclosure. It will be apparent to those skilled in the art that various modifications and variations can be made to implement generation unit 130, in order to provide high pressure gas, or working fluid with potential energy for driving the turbine and the generator to produce electricity.

Figure 11:
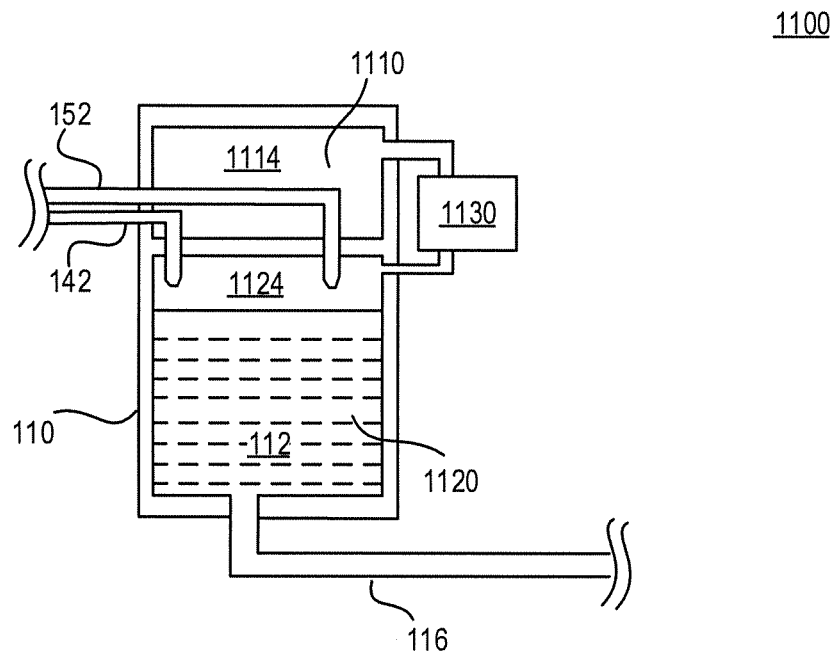
FIG. 11, FIG. 12, and FIG. 13 illustrate alternative designs of a chamber in a device to generate power, consistent with some embodiments of the present disclosure.

In addition, different designs and configurations can also be applied in chamber 110 and chamber 120 to achieve greater thermal efficiency in the thermodynamic engine. Reference is made to FIG. 11, which illustrates an alternative design of chamber 110 in a device 1100 to generate power, consistent with some embodiments of the present disclosure. In device 1100, chamber 110 includes two separate partitions, sub-chambers 1110 and 1120. Sub-chamber 1110 contains gas in space 1114, and sub-chamber 1120 contains working fluid 112 and gas, above a portion of working fluid 112, in space 1124. Device 1100 further includes a regenerator 1130 coupled between sub-chambers 1110 and 1120. During the operations of device 1100, in the constant-volume heat-addition process, regenerator 1130 can be configured to provide heat when the gas flows, via regenerator 1130, from sub-chamber 1110 to sub-chamber 1120. Similarly, in the constant-volume heat removal process, regenerator 1130 can be configured to store heat when the gas flows, via regenerator 1130, from sub-chamber 1120 to sub-chamber 1110. As a result, the gas in space 1114 remains at a relative low temperature, compared to the gas in space 1124. By utilizing regenerator 1130 to heat and cool the gas flowing between two sub-chambers 1110 and 1120, the required input energy in the constant-volume heat-addition process (e.g., curve 240 from operating point D to operating point A in FIG. 2) can be lowered to achieve a greater thermal efficiency in a complete heat cycle. Moreover, while chamber 110 is used as an example in FIG. 11, the regenerator can also be applied in chamber 120 having sub-chambers to perform similar operations.

Figure 12:
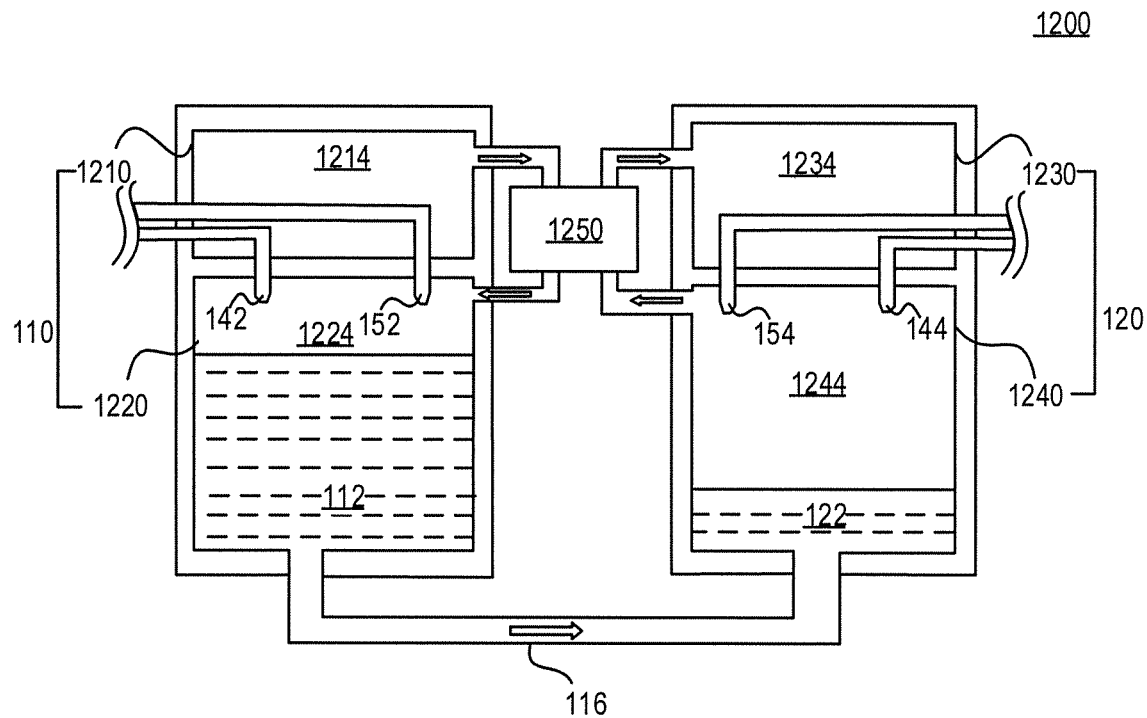

Reference is made to FIG. 12, which illustrates an alternative design of chambers 110 and 120, consistent with some embodiments of the present disclosure. In device 1200, each of the chambers 110 and 120 includes two separate partitions, sub-chambers 1210, 1220 and 1240, 1250 respectively. Sub-chambers 1210 and 1230 each contain gas in spaces 1214, 1234, and sub-chambers 1220 and 1240 each contain working fluid 112, 122 and gas, above a portion of working fluid 112, 122, in spaces 1224, 1244.

Device 1200 further includes a heat exchanger 1250 coupled with chamber 110 and chamber 120. Heat exchanger 1250 is configured to transfer heat between the gas flowing between sub-chambers 1210, 1220, and the gas flowing between sub-chambers 1230, 1240. Accordingly, during the operations of device 1200, in the constant-volume heat-addition process of chamber 110, which is also the constant-volume heat removal process of chamber 120, heat exchanger 1250 can be configured to transfer energy from the gas in the chamber 120 to the gas in the chamber 110, and vice versa. Therefore, by installing heat exchanger 1250 to exchange heat energy between chambers 110, 120 in device 1200, an improved thermal efficiency can be achieved in a complete heat cycle, and a manufacturing cost of device 1200 can be further reduced.

Figure 13:
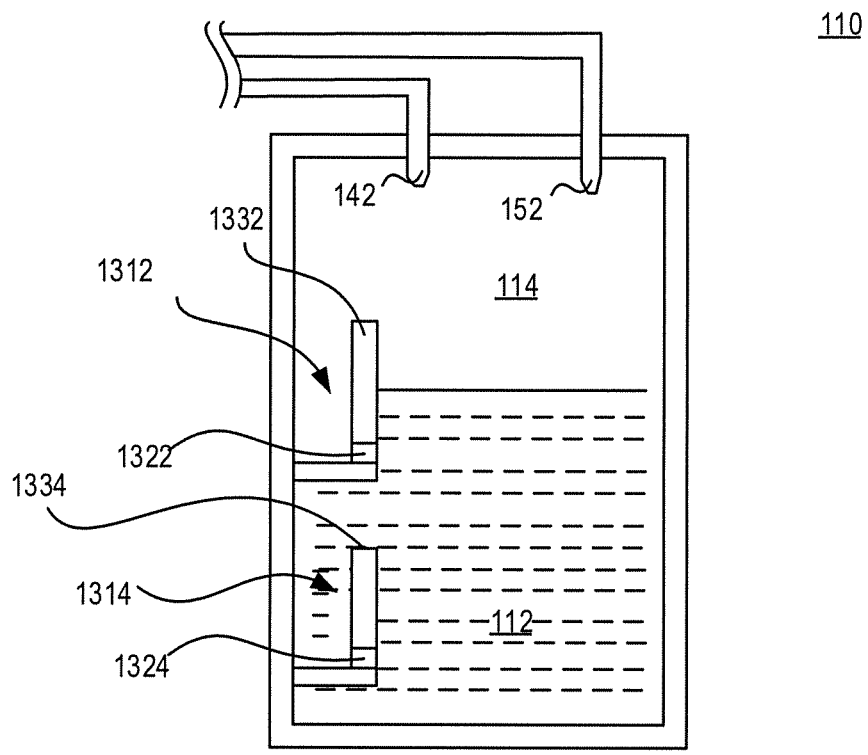

Reference is made to FIG. 13, which illustrates an alternative design of chamber 110, consistent with some embodiments of the present disclosure. In chamber 110 illustrated in FIG. 13, a control valve 1322 is arranged and located at a lower portion of a wall 1332 and configured to selectively open or close a path communicating a partition region 1312 with a main region of chamber 110. Similarly, a control valve 1324 is arranged and located at a lower portion of a wall 1334 and configured to selectively open or close a path communicating a partition region 1314 with the main region of chamber 110. In some embodiments, control valves 1322, 1324 are one-way valves, also known as check valves or non-return valves, such that liquid only flows from partition regions 1312, 1314 into the main region when control valves 1322, 1324 are opened.

When the level of working fluid 112 is higher than wall 1332, working fluid 112 flows into separate partition region 1312. As the level of working fluid 112 falls during the operations, control valve 1322 is configured to provide a flow path in response to a detection that the level of working fluid 112 is lower than control valve 1322, so that working fluid 112 in partition region 1312 flows into the main region accordingly. At this period, heating spray 142 is configured to spray the liquid to heat more gas in space 114. The same operations can be applied to control valve 1324, so that working fluid 112 in partition region 1314 flows into the main region in response to a detection that the level of working fluid 112 is lower than control valve 1324.

On the other hand, when working fluid 112 rises during the operations of chamber 110, since both control valves 1322, 1324 are one-way valves, working fluid 112 flows into separate partition region 1314 after the level of working fluid 112 is higher than wall 1334. Then, working fluid 112 flows into separate partition region 1312 after the level of working fluid 112 is higher than wall 1332.

It should be appreciated that, while two separate partition regions 1312, 1314 are illustrated in the embodiments shown in FIG. 13, various modifications can be made in accordance with actual needs. Those skilled in the art can modify the number of walls and partition regions, as well as locations and arrangements of partition regions, etc., based on requirements in different applications. For example, in some embodiments, instead of being arranged at a side, one or more partition regions can be arranged at a center region of the chamber. Furthermore, size, shape, volume, and/or other characteristics of chambers located in the thermodynamic engine in various embodiments mentioned above can be determined and modified based on different needs in practical applications, such as scale or output power of the thermal energy conversion system, the location to build the thermal energy conversion system and its geographical constraints or bathyorographic conditions.

Figure 14:
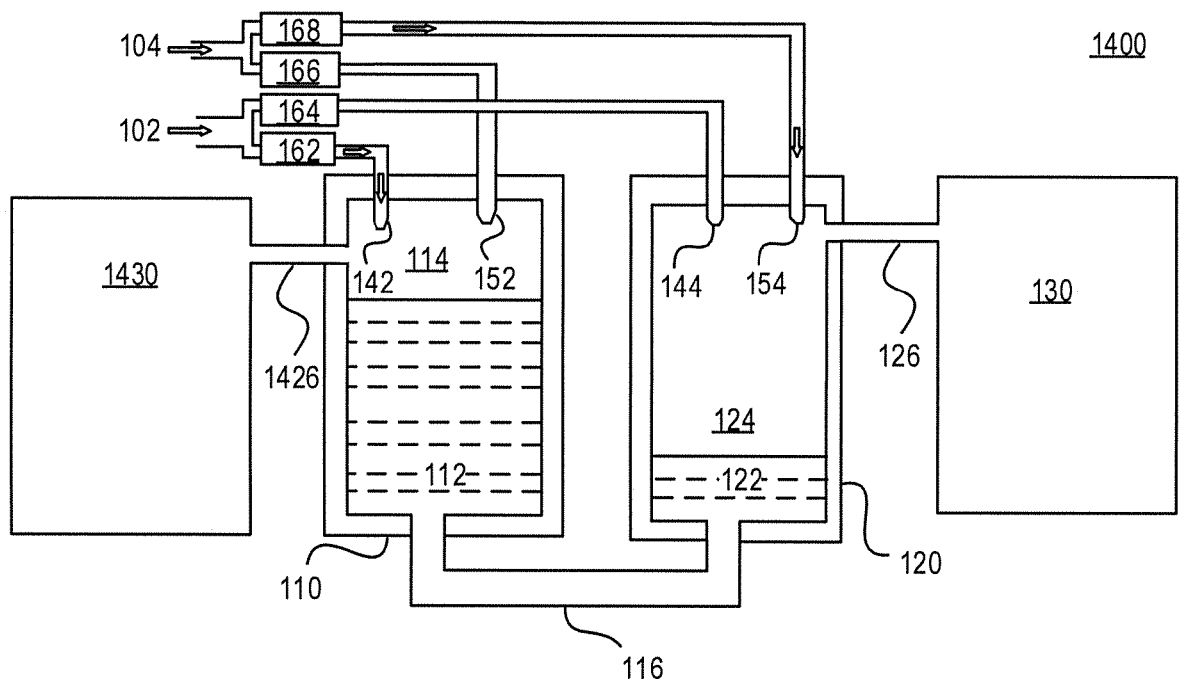
FIG. 14 illustrates an exemplary device to generate power, consistent with some embodiments of the present disclosure.

Reference is made to FIG. 14, which illustrates a device 1400 to generate power, consistent with some embodiments of the present disclosure. Compared to device 100 shown in FIG. 1, device 1400 includes two power-extraction units 130 and 1430 coupled with chambers 120 and 110 respectively. More particularly, power-extraction unit 1430 is coupled with chamber 110 via a flow passage 1426.

Similar to operations in FIG. 1, at least one of the heating and cooling of space 124 causes at least one of a compression or expansion force of space 114. Accordingly, the compression or expansion force of space 114 drives power-extraction unit 1430 coupled with chamber 110. Accordingly, the turbine and the generator can be further connected to power-extraction unit 1430 and driven by gas or by other working fluids outputted from power-extraction unit 1430 to generate electricity, in response to variations in a temperature of space 114 and of space 124. Detailed operations of the power-extraction unit are discussed in various embodiments above.

Figure 15:
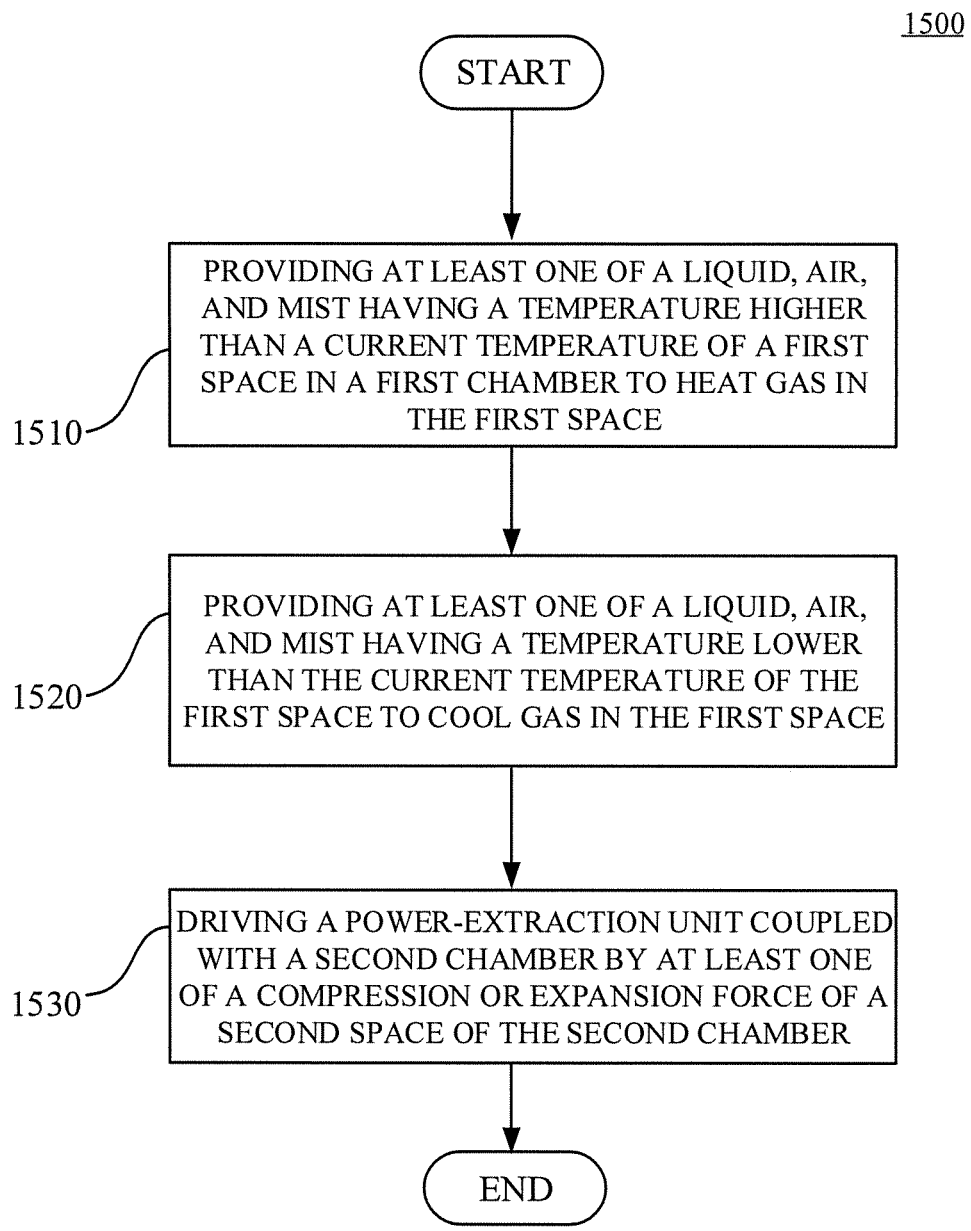
FIG. 15 is a flow diagram illustrating an exemplary method for generating power, consistent with some embodiments of the present disclosure.

FIG. 15 is a flow diagram of an exemplary method 1500 for generating power, consistent with some embodiments of the present disclosure. Method 1500 can be performed by a thermodynamic engine (e.g., device 100 in FIG. 1) or an energy conversion system (e.g., systems 500, 700 in FIG. 5 and FIG. 7). Method 1500 includes steps S1510, S1520, and S1530.

In step S1510, the thermodynamic engine provides at least one of a liquid, air, and mist having a temperature higher than a current temperature of a first space (e.g., space 114) in a first chamber (e.g., chamber 110) to heat gas in the first space. For example, a first heating spray (e.g., heating spray 142) can spray liquid or mist to heat gas in the first space. In some embodiments, at the same time, the thermodynamic engine can further provide, by a second cooling spray (e.g., cooling spray 154), at least one of a liquid, air, and mist having a temperature lower than a current temperature of a second space (e.g., space 124) in a second chamber (e.g., chamber 120) to cool gas in the second space.

In step S1520, the thermodynamic engine provides at least one of a liquid, air, and mist having a temperature lower than the current temperature of the first space in the first chamber to cool gas in the first space. For example, a first cooling spray (e.g., cooling spray 152) can spray liquid or mist to cool gas in the first space. In some embodiments, at the same time, the thermodynamic engine can further provide, by a second heating spray (e.g., heating spray 144), at least one of a liquid, air, and mist having a temperature higher than a current temperature of the second space in the second chamber to heat gas in the second space.

In step S1530, the thermodynamic engine drives a power-extraction unit (e.g., power-extraction unit 130) coupled with the second chamber by at least one of a compression or expansion force of the second space of the second chamber.

More particularly, the compression or expansion force is caused by the heating or cooling of the first space.

By repeating the above operations in steps S1510-S1530, the power-extraction unit can output gas or the working fluid to drive a generator that generates electricity in response to variations in the temperature of the first space and the second space accordingly.

In view of the above, in various embodiments of the present disclosure, the thermodynamic engine can perform energy conversion to transform the energy in a heat source, such as ocean thermal energy, geothermal energy, landfill heat energy, waste heat from industrial processes, etc., in different forms such as potential energy of liquid or kinetic energy of gas, to drive the turbine and generator to produce electricity. The thermodynamic engine in various embodiments achieves a simplified structure having fewer device components and simple pipe arrangements. Therefore, the manufacturing cost and the per unit electricity generation cost can be lowered.

In addition, since the proposed thermodynamic engine can run with low temperature difference between the chambers, it can be widely applied in different thermal energy conversion systems which use ocean thermal energy, geothermal energy, landfill heat energy, waste heat from industrial processes, etc., as the heat source. Furthermore, in some embodiments with the high temperature difference between the chambers, the proposed thermodynamic engine may further provide a higher energy conversion efficiency when compared to the conventional thermodynamic engines.

In the foregoing specification, embodiments have been described with reference to numerous specific details that can vary from implementation to implementation. Certain adaptations and modifications of the described embodiments can be made. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the drawings and specification, there have been disclosed exemplary embodiments. It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A power generation device comprising:
    a first chamber containing a working fluid and a first space inside the first chamber, the first space being above a portion of the working fluid that is within the first chamber;
    a second chamber coupled with the first chamber, the working fluid flowable between the first chamber and the second chamber via a flow passage between the first chamber and the second chamber, the second chamber containing a second space inside the second chamber, the second space being above a portion of the working fluid that is within the second chamber;
    at least one first spray device coupled with the first chamber to heat or cool the first space in the first chamber; and
    at least one second spray device coupled with the second chamber to heat or cool the second space in the second chamber, wherein at least one of the heating and cooling of the first space causes at least one of a compression or expansion force of the second space, and the at least one of a compression or expansion force of the second space drives a power-extraction unit coupled with the second chamber by gas outputted from the second space to the power-extraction unit.

2. The power generation device of claim 1, further comprising a generator that generates electricity driven by gas or by the working fluid outputted from the power-extraction unit, in response to variations in a temperature of the first space and of the second space.

3. The power generation device of claim 1, wherein the at least one first spray device comprises:
    a first heating spray configured to heat the first space in the first chamber, wherein the first heating spray sprays a fluid comprising at least one of a liquid, air, or mist having a temperature higher than a current temperature of the first space; and
    a first cooling spray configured to cool the first space in the first chamber, wherein the first cooling spray sprays a fluid comprising at least one of a liquid, air, or mist having a temperature lower than the current temperature of the first space.

4. The power generation device of claim 3, further comprising:
    a first liquid recycle chamber coupled with the first chamber, wherein the first cooling spray sprays the fluid into the first chamber, and the first heating spray sprays the liquid into the first liquid recycle chamber; and
    a first liquid recycle valve coupled with the first liquid recycle chamber and configured to control a passage for discharging liquid in the first liquid recycle chamber.

5. The power generation device of claim 3, wherein the first heating spray and the first cooling spray respectively spray the fluid into the first chamber.

6. The power generation device of claim 1, wherein the at least one second spray device comprises:
    a second heating spray configured to heat the second space in the second chamber, wherein the second heating spray sprays at least one of a heating liquid, air, and mist having a temperature higher than a current temperature of the second space; and
    a second cooling spray configured to cool the second space in the second chamber, wherein the second cooling spray sprays at least one of a liquid, air, and mist having a temperature lower than the current temperature of the second space.

7. The power generation device of claim 1, further comprising:
    a discharging valve coupled with the first chamber or the second chamber and configured to control a discharging passage for discharging the working fluid.

8. The power generation device of claim 1, wherein the power-extraction unit comprises:
    a third chamber coupled with the second chamber via a second flow passage, the third chamber containing the working fluid and a third space inside the third chamber above a portion of the working fluid that is within the third chamber.

9. The power generation device of claim 8, wherein the power-extraction unit further comprises:
   an output terminal coupled with the third chamber, wherein gas within the third space is outputted from the third chamber via the output terminal, in response to the at least one of the compression or expansion force of the second space; and
   an input terminal coupled with the third chamber, wherein gas with a pressure lower than an output pressure of the gas outputted from the third chamber is fed into the third chamber via the input terminal.

10. The power generation device of claim 8, wherein the power-extraction unit further comprises:
    a fourth chamber coupled with the third chamber, the working fluid flowable between the third chamber and the fourth chamber via a third flow passage, the fourth chamber containing a fourth space inside the fourth chamber above a portion of the working fluid that is within the fourth chamber;
    an output terminal coupled with the fourth chamber, wherein gas within the fourth space is outputted from the fourth chamber via the output terminal, in response to the at least one of the compression or expansion force of the second space; and
    an input terminal coupled with the fourth chamber, wherein gas with a pressure lower than an output pressure of the gas outputted from the fourth chamber is fed into the fourth chamber via the input terminal.

11. The power generation device of claim 8, wherein the power-extraction unit further comprises:
    a fourth chamber coupled with the third chamber, the working fluid flowable between the third chamber and the fourth chamber via a third flow passage;
    an output terminal coupled with the fourth chamber, wherein the working fluid within the fourth chamber is raised and outputted via the output terminal in response to the at least one of the compression or expansion force of the second space; and
    an input terminal coupled with the fourth chamber, wherein the working fluid flows into the fourth chamber via the input terminal.

12. The power generation device of claim 1, wherein the first chamber comprises a first sub-chamber containing gas and a second sub-chamber containing the working fluid and the gas; and the device further comprises:
    a regenerator coupled between the first sub-chamber and the second sub-chamber and configured to provide heat when the gas flows, via the regenerator, from the first sub-chamber to the second sub-chamber, and to store heat when the gas flows, via the regenerator, from the second sub-chamber to the first sub-chamber.

13. The power generation device of claim 1, wherein the first chamber and the second chamber each comprises a first sub-chamber containing gas and a second sub-chamber containing the working fluid and the gas, and the device further comprises:
    a heat exchanger coupled with the first chamber and with the second chamber, and configured to transfer heat between the gas flowing between the first sub-chamber and the second sub-chamber of the first chamber, and the gas flowing between the first sub-chamber and the second sub-chamber of the second chamber.

14. The power generation device of claim 1, wherein at least one of the heating and cooling of the second space causes at least one of a compression or expansion force of the first space, and the at least one of a compression or expansion force of the first space drives a second power-extraction unit coupled with the first chamber.

15. An energy conversion system, comprising:
    a plurality of devices to generate power, any one of the devices comprises:
       a first chamber containing a working fluid and a first space inside the first chamber, the first space being above a portion of the working fluid that is within the first chamber;
       a second chamber coupled with the first chamber, the working fluid flowable between the first chamber and the second chamber via a flow passage between the first and second chambers, the second chamber containing a second space inside the second chamber, the second space being above a portion of the working fluid that is within the second chamber;
       at least one first spray device coupled with the first chamber to heat or cool the first space in the first chamber; and
       at least one second spray device coupled with the second chamber to heat or cool the second space in the second chamber, wherein at least one of the heating and cooling of the first space causes at least one of a compression or expansion force of the second space, and the at least one of a compression or expansion force of the second space drives a power-extraction unit coupled with the second chamber by gas outputted from the second space to the power-extraction unit.

16. The energy conversion system of claim 15, wherein the at least one first spray device comprises a first heating spray configured to heat the first space, and a first cooling spray configured to cool the first space, and the energy conversion system further comprises:
    a first input passage connecting to the first heating sprays of the plurality of devices and configured to provide a fluid having a temperature higher than a current temperature of the first space; and
    a second input passage connecting to the first cooling sprays of the plurality of devices and configured to provide a fluid having a temperature lower than the current temperature of the first space.

17. The energy conversion system of claim 15, further comprising:
    a discharging passage for discharging the working fluid;
    wherein any one of the devices further comprises a first valve coupled between the discharging passage and at least one of the first chamber or the second chamber, and configured to control the discharging passage for discharging the working fluid.

18. The energy conversion system of claim 15, wherein the at least one first spray device comprises a first heating spray configured to heat the first space, and a first cooling spray configured to cool the first space, and any one of the devices further comprises:
    a first liquid recycle chamber coupled with the first chamber, wherein the first cooling spray sprays the fluid into the first chamber, and the first heating spray sprays the liquid into the first liquid recycle chamber; and
    a first liquid recycle valve coupled with the first liquid recycle chamber and configured to control a passage for discharging liquid in the first liquid recycle chamber.

19. The energy conversion system of claim 15, further comprises a generator that generates electricity driven by gas or by the working fluid outputted from the power-extraction units of the plurality of devices, in response to variations in a temperature of the first spaces and of the second spaces of the plurality of devices.

20. A method for generating power, comprising:
- providing at least one of a liquid, air, and mist having a temperature higher than a current temperature of a first space in a first chamber to heat gas in the first space, the first space being above a portion of a working fluid that is within the first chamber;
- providing at least one of a liquid, air, and mist having a temperature lower than the current temperature of the first space to cool gas in the first space; and
- driving a power-extraction unit coupled with a second chamber, by gas outputted from a second space of the second chamber to the power-extraction unit, by at least one of a compression or expansion force of the second space, the second space being above a portion of the working fluid that is within the second chamber, wherein the second chamber is coupled with the first chamber, the working fluid is flowable between the first chamber and the second chamber via a flow passage between the first chamber and the second chamber, and the compression or expansion force is caused by the heating or cooling of the first space.

* * * * *